E. A. & H. G. Smith.
Harvester Pitman.
No. 78,144.     Patented May 19, 1868.
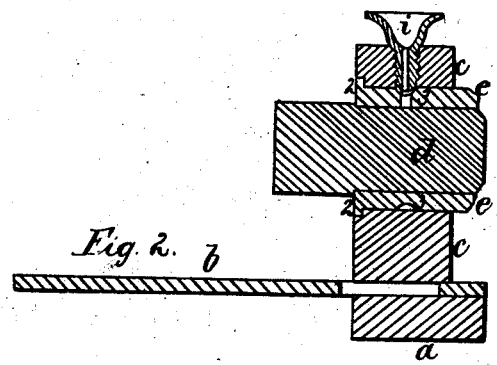
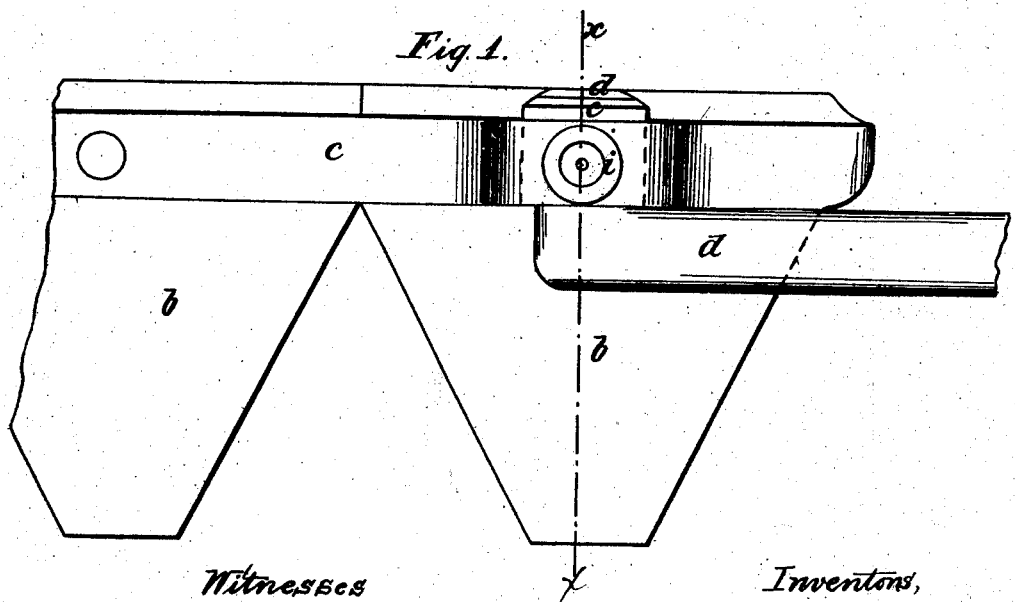
Witnesses
Geo. D. Walker
Chas H Smith
Inventors,
Edward A. Smith
Haskell G. Smith
per L. W. Sewell

United States Patent Office.

EDWARD A. SMITH, OF ST. ALBANS, VERMONT, AND HASKELL G. SMITH, OF GOSHEN, CONNECTICUT.

Letters Patent No. 78,144, dated May 19, 1868; antedated May 9, 1868.

---

IMPROVEMENT IN HARVESTERS.

---

The Schedule referred to in these Letters Patent and making part of the same.

---

TO ALL WHOM IT MAY CONCERN:

Be it known that we, EDWARD A. SMITH, of St. Albans, in the State of Vermont, and HASKELL G. SMITH, of Goshen, in the State of Connecticut, have invented, made, and applied to use, a certain new and useful Improvement in Mowing and Reaping-Machines; and we do hereby declare the following to be a full, clear, and exact description of the said invention, reference being had to the annexed drawing, making part of this specification, wherein—

Figure 1 is a plan of our improvement, and
Figure 2 is a vertical section at the line $x$ $x$.

The same parts are denoted by corresponding letters.

Heretofore the connecting-rod from the crank to the cutter-bar has passed into a hole in a piece of iron attached to the upper and inner end of the cutter-bar. It is very difficult to prevent wear in the hole of this cutter-bar connection, and the noise and injury are constantly increased as the parts wear away.

Our invention relates to the manner of making this connection between the connecting-rod and cutter-bar, and consists in a bush introduced in the cutter-bar connection, and applied in such a manner that the friction will be very much lessened, and that the bush can be removed, and another substituted when worn. Thus our machine is rendered much more durable than heretofore, and considerable noise is prevented.

In the drawing, $a$ is the bar carrying the cutters $b$ $b$. $c$ is the iron bar attached above the cutters, at the inner end of the cutter-bar, and $d$ is a part of the connecting-rod, formed with a cylindrical end, that ordinarily passes into the part $c$, a hole being provided for it. We however introduce the movable bush $e$, made of brass or similar metal, to lessen the friction and prevent the parts becoming rusted together when not in use.

This bush $e$ is made with a flange, 2, entering a recess in the bar $c$, so as to be almost flush with the same, and 3 is a groove turned in the exterior of said bush $e$, to form an oil-receptacle, communicating, by a hole, to the journal on the end of the connecting-rod $d$.

$i$ is an oil-cup screwed through $c$, with its end entering the groove 3, but not setting therein so tightly as to prevent oil passing freely to the parts to be lubricated.

The bush $e$ may be free to turn while in use, or it may be moved around progressively, from time to time, and prevent the wear being in one place.

What we claim, and desire to secure by Letters Patent, is—

The bush $e$, made as set forth, and introduced in the end of the cutter-bar, to receive the journal of the connecting-rod, in combination with the oil-receptacle $i$, as and for the purposes set forth.

In witness whereof, we have hereunto set our signatures, this 7th day of September, 1867.

EDWARD A. SMITH,
HASKELL G. SMITH.

Witnesses:
GEO. D. WALKER,
GEO. T. PINCKNEY,
H. P. HALL,
R. R. SHERMAN.